US005136845A

United States Patent [19]

Woodley

[11] Patent Number: 5,136,845

[45] Date of Patent: Aug. 11, 1992

[54] HYDROSTATIC TRANSMISSION AND RELIEF VALVE THEREFOR

[75] Inventor: Wayne D. Woodley, Arnolds Park, Iowa

[73] Assignee: Eaton Corporation, Cleveland, Ohio

[21] Appl. No.: 751,260

[22] Filed: Aug. 29, 1991

[51] Int. Cl.5 .............................................. F16D 31/02

[52] U.S. Cl. ........................................ 60/468; 60/489; 60/494; 137/491; 137/505.13

[58] Field of Search ................. 60/468, 488, 489, 494; 137/491, 489, 505.13

[56] References Cited

U.S. PATENT DOCUMENTS 3,199,297 8/1965 Croswhite ............................ 91/497
3,704,588 12/1972 Trabbic ................................ 60/489
3,906,993 9/1975 Adams et al. ....................... 137/491

*Primary Examiner*—Edward K. Look
*Assistant Examiner*—F. Daniel Lopez
*Attorney, Agent, or Firm*—L. J. Kasper

[57] ABSTRACT

A hydrostatic transmission is provided of the type including a pump (15), a motor (17), and a pintle assembly (35) defining high (61) and low (63) pressure fluid conduits. In communication with the conduits, the pintle assembly includes a pair of acceleration valves (85, 89), each of which comprises a differential area piston. Adjacent each acceleration valve is a pilot valve means (95) disposed in a pilot bore (105) and including a valve member (115) operable, in response to system pressure in excess of the pressure relief setting of a spring (117) to relieve fluid pressure in a chamber (101), such that the acceleration valve (85) is biased toward an open position (FIG. 5) relieving fluid pressure spikes from the high pressure conduit (61) to the low pressure conduit (63).

10 Claims, 4 Drawing Sheets

95
79
75
85
103
87
75
61
67
93
77
69
81
89
91
77
63
97
65

HYDROSTATIC TRANSMISSION AND RELIEF VALVE THEREFOR

BACKGROUND OF THE DISCLOSURE

The present invention relates to hydrostatic transmissions, and more particularly, to such transmissions of the closed-loop type.

Although the present invention may be utilized with hydrostatic transmissions in which the pump and motor elements may be of various types, the invention is especially advantageous when used in a hydrostatic transmission in which the pump and motor are of the radial piston (ball) type. Therefore, the invention will be described in connection with an embodiment of the radial ball type.

A typical hydrostatic transmission of the radial ball type includes a pintle assembly having journal portions on which the radial ball elements are rotatably mounted. The journal portions define grooves which provide fluid communication between the radial ball elements and passageways defined by the journal portions, the passageways comprising the high pressure and low pressure system conduits.

A hydrostatic transmission of the type to which the present invention is especially suited is produced by the assignee of the present invention and sold commercially under the designations Model 7 and Model 11. Such a transmission is illustrated and described in greater detail in U.S. Pat. No. 4,091,717, assigned to the assignee of the present invention and incorporated herein by reference. Such transmissions are typically used to propel lawn and garden tractors, or other similar vehicles which are relatively small and inexpensive. Thus, the size, weight, and expense of the transmission must be minimized to be commercially acceptable for use on such vehicles.

Although such hydrostatic transmissions have been extremely successful commercially, there have occasionally been pressure-related failures of various components. For example, there have been instances where pressure spikes resulted in the breaking of the journal portion at the groove which communicates fluid to or from one of the radial ball units. In addition, there have also been instances where pressure spikes (or torque spikes) have resulted in broken output shafts.

In order to overcome such pressure related failures, it would appear obvious to one skilled in the art to provide pressure relief valves. However, in hydrostatic transmissions of the type to which the present invention relates, it would not be economically feasible to incorporate a pair of commercially available relief valve cartridges or relief valve assemblies. Furthermore, aside from the cost, there is the problem of the location of such relief valves. For example, in the commercially available Model 7 and Model 11 transmissions referred to previously, the pintle (disposed between the radial ball pump and radial ball motor units) already includes a pair of damper pistons (to overcome the effects of vibrations emanating from the variable radial ball pump); a pair of check valve assemblies (to insure that neither system conduit is below reservoir pressure); and a pair of acceleration valve assemblies (to insure a smooth start-up of the vehicle, from a stop condition, for either forward or reverse movement). Therefor, it would be nearly impossible, as a practical matter, to add relief valve assemblies without substantial redesign of at least the pintle assembly.

SUMMARY OF THE INVENTION

Accordingly, it is an object of the present invention to provide an improved hydrostatic transmission having both acceleration valve capability and over-pressure relief protection, in a compact, relatively inexpensive package.

The above and other objects are accomplished by the provision of an improved hydrostatic transmission comprising a pump for supplying pressurized fluid, a motor adapted to receive pressurized fluid from the pump, and means defining a high pressure fluid conduit communicating the pressurized fluid from the pump to the motor, and a low pressure fluid source. A housing means defines a valve bore in fluid communication with the high pressure fluid conduit and with the low pressure fluid source. An acceleration valve is disposed within the valve bore and comprises a differential area piston having a first surface of relatively smaller area, and a second, opposing surface of relatively larger area. There is a means biasing the differential area piston toward an open position permitting fluid communication from the high pressure fluid conduit to the low pressure fluid source, high pressure fluid acting on the first surface cooperating with the biasing means to bias the differential area piston toward the open position. The piston defines restricted fluid passage means operable to communicate high pressure fluid to a chamber defined by the bore and the second surface, the differential area piston being biased by the high pressure fluid acting on the second surface gradually to overcome the biasing force of the biasing means, and the high pressure fluid acting on the first surface and to move toward a closed position blocking fluid communication from the high pressure fluid conduit to the low pressure fluid source, as the fluid pressure in the high pressure fluid conduit gradually increases.

The improved hydrostatic transmission is characterized by the housing means defining a pilot bore disposed to provide fluid communication between the chamber and the low pressure fluid source. Pilot valve means is disposed in the pilot bore and includes a valve member movable between a first position blocking fluid communication from the chamber to the low pressure fluid source, and a second position permitting fluid communication from the chamber to the low pressure fluid source. The pilot valve means includes means biasing the valve member toward a second position with a sufficient force whereby, only when the fluid pressure in the high pressure fluid conduit exceeds a predetermined fluid maximum, the fluid pressure in the chamber exceeds the predetermined maximum, overcoming the force of the pilot valve biasing means and moving the valve member to the second position. The fluid pressure in the chamber substantially decreases and the differential area piston is biased toward the open position, thereby relieving the fluid pressure in the high pressure fluid conduit.

DESCRIPTION OF THE PREFERRED EMBODIMENT

Figure 1:
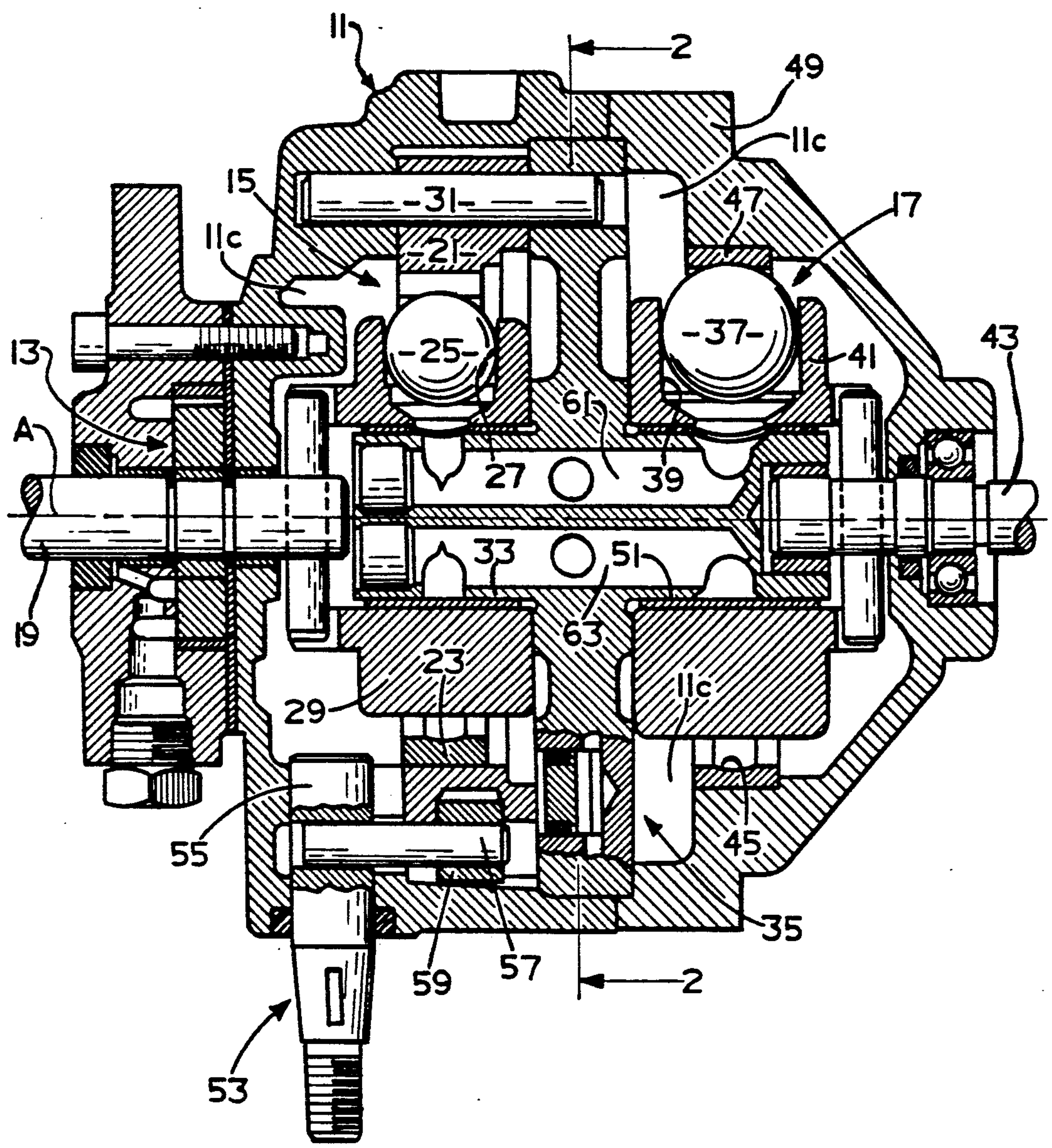
FIG. 1 is an axial cross-section of a hydrostatic transmission of the type with which the present invention may be utilized.

Referring now to the drawings, which are not intended to limit the invention, FIG. 1 illustrates a hydrostatic transmission of the general type sold commercially by the assignee of the present invention as either a Model 7 or a Model 11 light duty hydrostatic transmission.

The transmission of FIG. 1 includes a housing 11 enclosing a charge pump (make-up pump) 13, a variable displacement radial ball pump 15, and a fixed displacement radial ball motor. A prime mover (not shown) is connected to an input shaft 19 to simultaneously rotate components of the charge pump 13 and the radial ball pump 15. The pump 15 includes a movable (pivotable) cam ring assembly 21 having a circular, concave race 23 which mates with a plurality of pump balls 25 which are located in bores 27 of an annular pump rotor 29. The cam ring 21 is free to pivot about the axis of a cam pivot pin 31 to vary the eccentricity of the race 23 relative to the axis of rotation A of the transmission. Rotation of the pump rotor 29 about a journal portion 33 of a pintle assembly 35 moves the balls 25 radially outwardly and ,inwardly in the bores 27, causing fluid to be forced by the balls 25 through passages (to be described in greater detail subsequently) defined by the journal portion 33 to one side of motor balls 37, located within bores 39, defined by an annular motor rotor 41.

The motor rotor 41 is connected to an output shaft 43 which is axially aligned with the input shaft 19. The motor balls 37 move radially outwardly under the pressure of the fluid from the pump 15, remaining in contact with a circular concave race 45 defined by a cam ring assembly 47. The cam ring 47 is rigidly secured to a body portion 49 of the housing 11 and has the race 45 mounted eccentric relative to the axis of rotation A. The motor rotor 41 rotates around a journal portion 51 of the pintle 35 as a result of movement of the balls 37 into and out of the bores 39. Appropriate seals, bearings, and bushings are provided throughout the transmission to prevent fluid from escaping from the housing 10, and to allow for rotation of the various components.

An appropriate control arrangement 53 including a control shaft 55, a control pin 57, and a cam ring insert 59 is provided to pivot the cam ring 21 about the pivot pin 31. Such pivotal movement is accomplished by rotating the control shaft 55 about its axis, which turns the control pin 57 and accordingly moves the cam ring insert 59 and cam ring 21. Movement of the cam ring 21 allows the pump 15 to vary from full displacement in one direction to zero displacement to full displacement in the other direction.

The direction of rotation of the motor 17 and the output shaft 43 is dependent upon the route taken by fluid pumped by the pump balls 25 and directed through the pintle assembly 35. For example, clockwise rotation of the motor 17 can be accomplished by the balls 25 forcing high pressure fluid through a passage 61, and then into the bores 39 of the motor. Low pressure fluid will then be returned from the motor to the pump by means of a passage 63. As is well known to those skilled in the art, the entire chamber defined by the housing 11 and surrounding the pump 15 and motor 17 is a low pressure, case drain chamber 11*c* which, under certain conditions, may be in direct fluid communication with the passage 63, as will be described subsequently. Counter-clockwise rotation of the motor 17 would occur if the cam ring 21 of the pump 15 were moved over-center, in which case high pressure fluid would be forced by the balls 25 through the passage 63 into the motor 17, with low pressure returning from the motor through the passage 61 to the pump. Hydrostatic transmissions of the type shown in FIG. 1 are generally well known, but certain additional details of the construction and operation of such transmissions can be obtained from U.S. Pat. No. 4,091,717, assigned to the assignee of the present invention and incorporated herein by reference.

Figure 2:
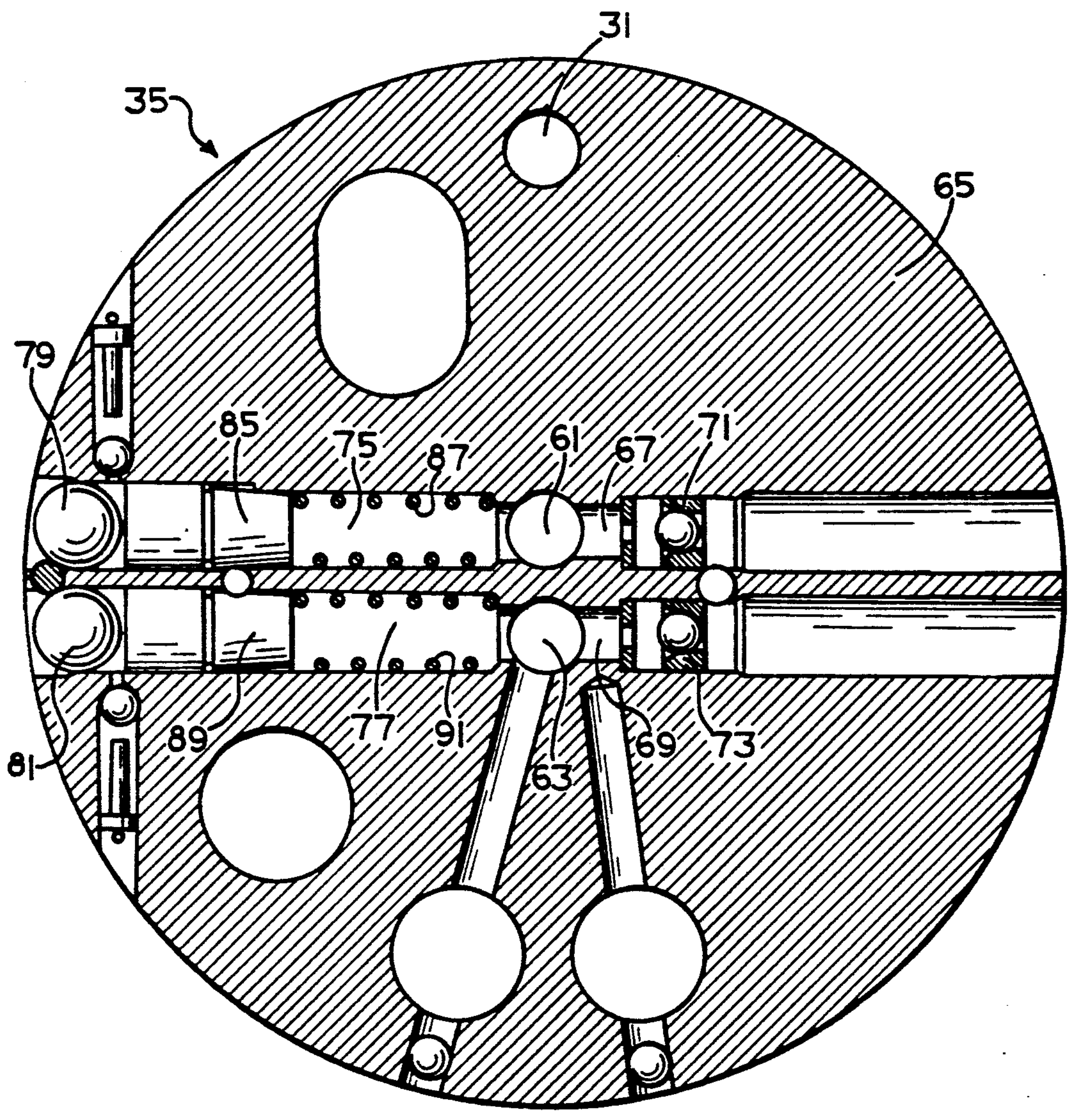
FIG. 2 is an enlarged, transverse cross-section, taken on line 2—2 of FIG. 1, showing only the pintle assembly.

Referring now primarily to FIG. 2, the pintle assembly 35 includes an annular, disc-like portion 65 which, typically, has the journal portion 33 of the pump and the journal portion 51 of the motor cast integrally therewith. For purposes of subsequent discussion, it will be assumed that the passage 61 is the high pressure passage, and that the motor output shaft 43 is rotating in the clockwise direction (as viewed from the left in FIG. 1).

Referring still to FIG. 2, the passage 61 is intersected by a bore 67, while the passage 63 is intersected by a bore 69. The right end of the bores 67 and 69 are enlarged, and have disposed therein check valve assemblies 71 and 73, respectively. As is well known to those skilled in the art, each check valve 71 or 73 is included to permit communication of makeup fluid from the case drain region 11*c* of the transmission to its respective passage 61 or 63, in the event that 10 the fluid pressure on the low pressure side of the system drops below atmospheric pressure.

Figure 5:
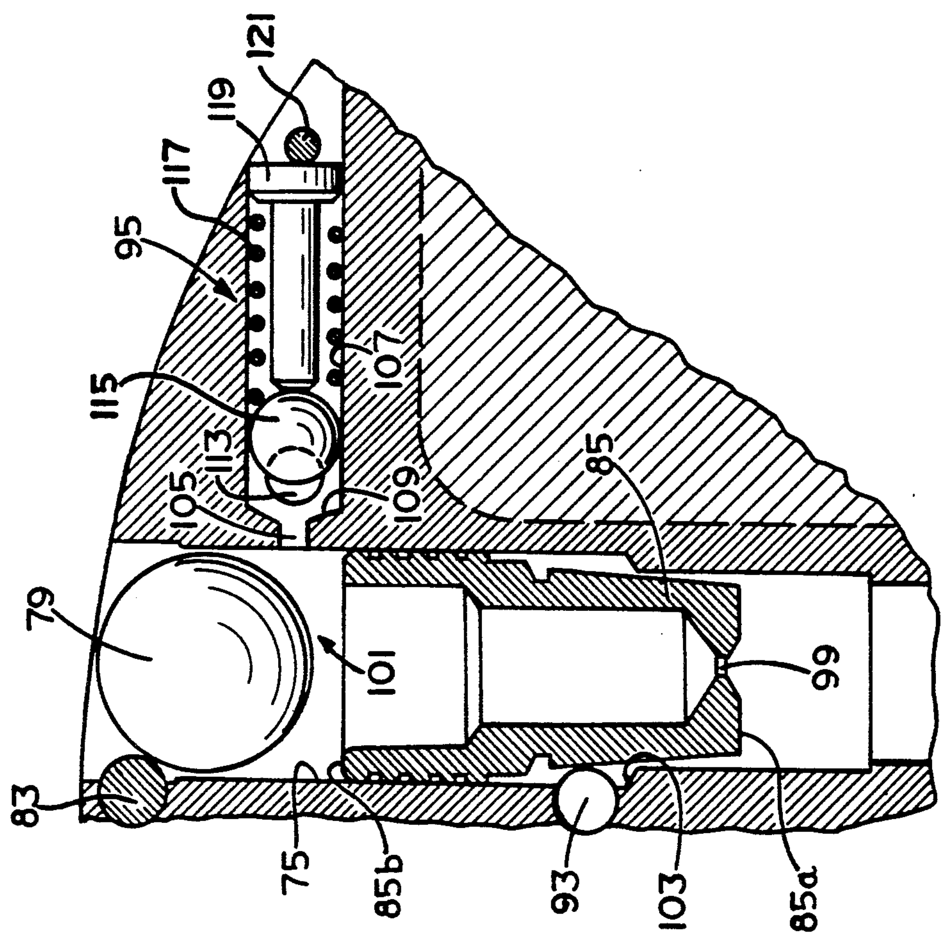
FIGS. 4 and 5 are further enlarged, fragmentary views similar to FIG. 3, each showing only a single acceleration valve, and illustrating the "normal" and "pressure relief" operating modes, respectively.
Figure 4:
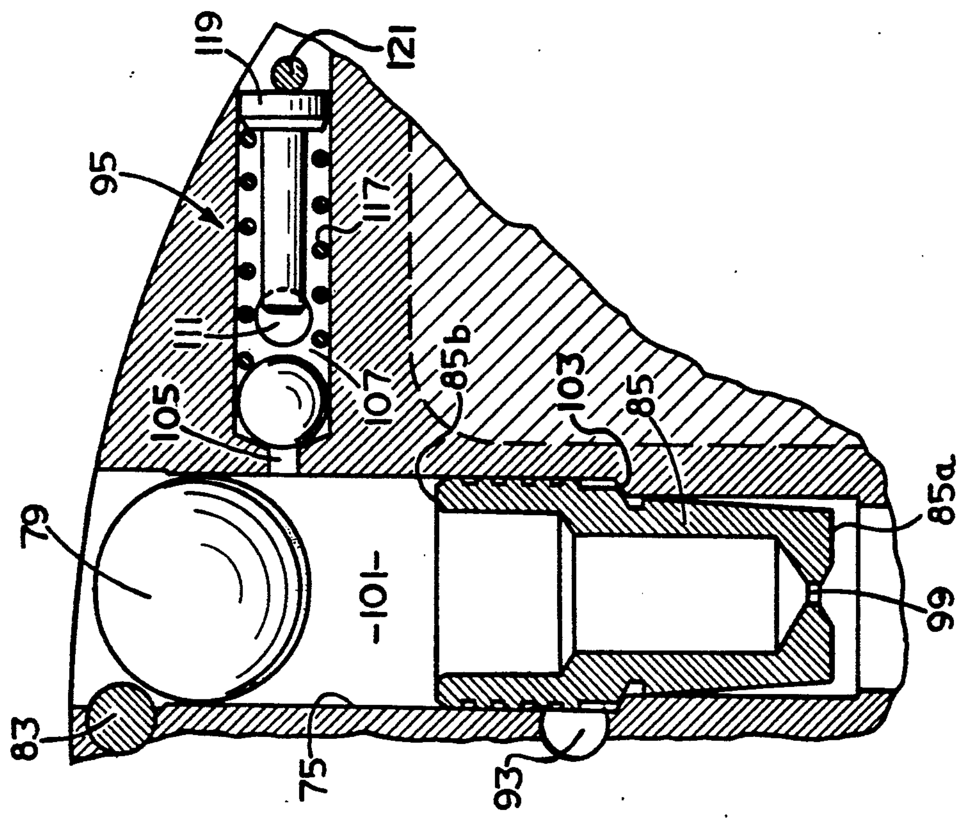

The left end of the bores 67 and 69 comprise enlarged bore portions 75 and 77, respectively, the outer ends of which are sealed by a pair of balls 79 and 81, respectively, which are retained by a pin member 83 (see FIGS. 4 and 5). Disposed within the bore portion 75 is an acceleration valve member 85, biased to the left in FIG. 2, toward the ball 79, by a biasing spring 87. Similarly, disposed within the bore portion 77 is an acceleration valve member 89, biased to the left in FIG. 2, toward the ball 81, by a biasing spring 91.

Figure 3:
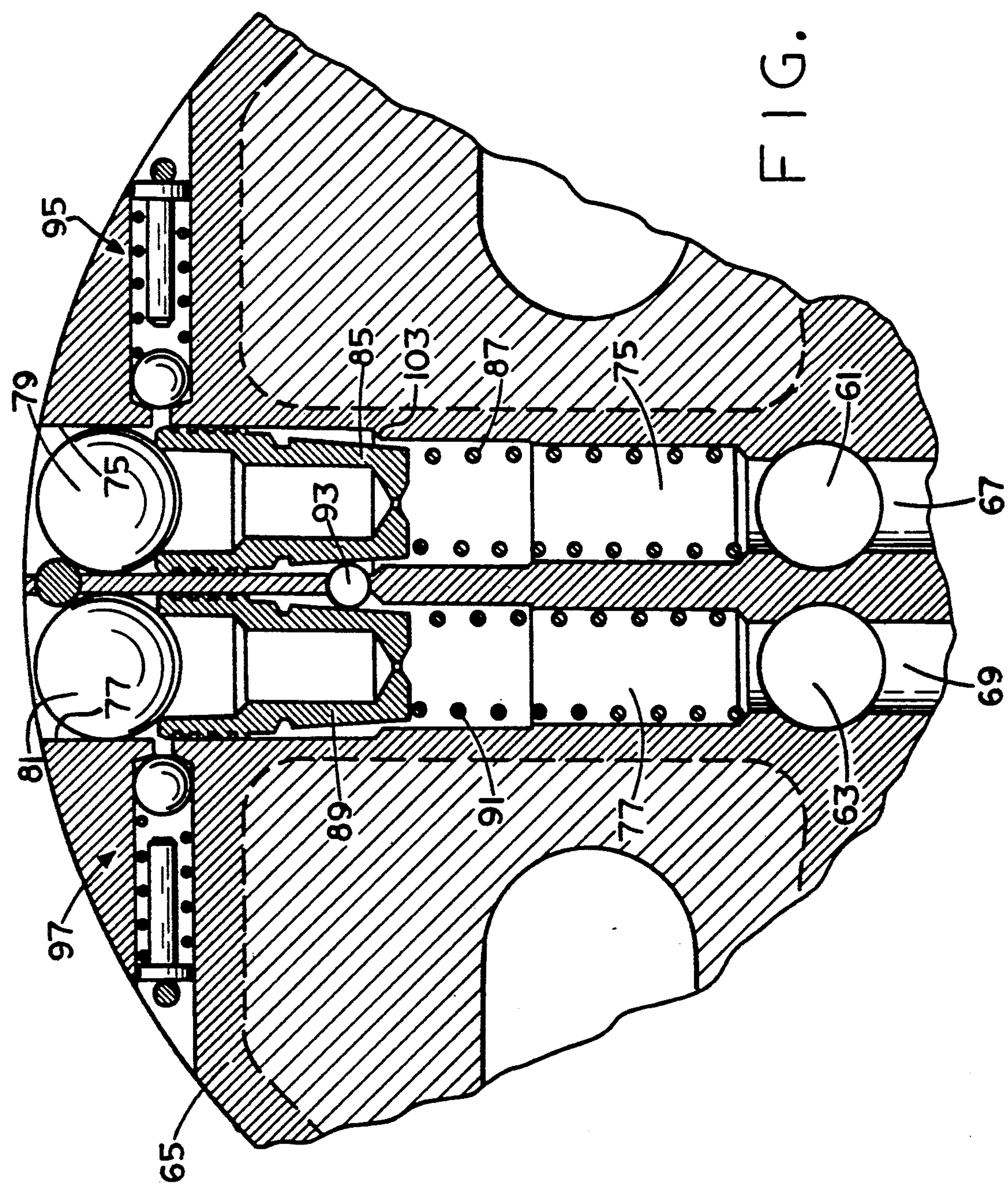
FIG. 3 is a further enlarged, transverse cross-section, similar to FIG. 2, showing the acceleration valves of the present invention in the "neutral" operating position.

Referring now to FIG. 3, the acceleration valve and relief valve assembly of the present invention is illustrated in somewhat greater detail. The disc-like portion 65 defines a cross bore 93, which provides relatively unrestricted fluid communication between the bore portion 75 and the bore portion 77 and thus, between the high pressure passage 61 and the low pressure passage 63. Disposed adjacent the bore portion 75, and in communication therewith, is a pilot valve assembly 95, and disposed adjacent the bore portion 77, and in communication therewith, is a pilot valve assembly 97. It will be understood by those skilled in the art that the acceleration valves 85 and 89 may be substantially identical to each other in construction and function, and similarly, the pilot valve assemblies 95 and 97 may be substantially identical in construction and function, and therefor, in each case only one will be described in detail.

Referring still to FIG. 3, the operating condition illustrated is the neutral, start-up condition in which fluid pressure is just beginning to build in the high pressure passage 61, and the acceleration valves 85 and 89 are biased against the balls 79 and 81, respectively, by the biasing springs 87 and 91, respectively. With the acceleration valve 85 in the position shown in FIG. 3, as pressure initially begins to build in the passage 61, and in the bore portion 75 (below the acceleration valve 85), fluid is communicated from the bore portion 75, through the acceleration valve 85, then through the cross bore 93 into the bore portion 77, and from there to the low pressure side of the system through the passage 63.

Referring now to FIG. 4, in conjunction with FIG. 3, the acceleration valve 85 defines a relatively small orifice 99 which permits restricted communication of high pressure from the bore portion 75, below the acceleration valve 85, into a chamber 101 defined by the bore portion 75, the ball 79, and the acceleration valve 85. The bore portion 75 defines a valve seat 103, disposed just upstream of the cross bore 93. As pressure begins to build in the passage 61, only a relatively smaller lower surface **85*a* of the acceleration valve 85 is subjected to the high pressure, tending to bias the acceleration valve 85 upward in FIGS. 3 and 4. High pressure in the chamber 101 acts on a relatively larger, upper surface 85*b*, such that high pressure in the chamber 101 gradually overcomes the biasing force of the spring 87 plus the fluid pressure below the acceleration valve 85 to bias the valve 85 downward until it engages the valve seat 103. The valve member 85 is referred to as an "acceleration" valve because the gradual closing of valve 85, as just described, results in a relatively smooth acceleration of the motor 17, rather than the relatively harsh, jerky acceleration of the motor 17** which would occur in the absence of the acceleration valves.

During normal operation of the transmission, with high pressure in the passage 61 driving the motor 17 in the clockwise direction, the acceleration valve 85 will remain in the seated position shown in FIG. 4, until the pump 15 ceases to pump pressurized fluid through the passage 61. At that time, fluid pressure in the chamber 101 would gradually decrease, and the biasing force of the spring 87 would eventually return the acceleration valve 85 to the position shown in FIG. 3, in preparation for the next start-up operation of the transmission. The structure and function described up to this point has been generally known and available commercially in products produced and marketed by the assignee of the present invention.

Referring now to FIG. 5, the operation of the present invention in the pressure relief mode will be described. During operation in the normal mode, as described in connection with FIG. 4, if the fluid pressure in the chamber 101 rises above a predetermined maximum pressure, the pilot valve assembly 95 comes into operation. The pilot valve assembly 95 comprises a restricted bore 105 defined by the disc-like portion 65, the bore 105 opening into a larger bore 107 and defining a valve seat 109. The bore 107 communicates with the case drain region **11*c* of the transmission by means of an opening 111 (see FIG. 4), and an opening 113 (see FIG. 5). Disposed within the bore 107 is a pilot ball 115, which is normally biased against the valve seat 109 by means of a biasing spring 117. Those skilled in the art may consider it desirable to utilize a seat insert (not illustrated herein) to avoid the problem of repeated engagement of the seat 109 by the ball 115 damaging the seat, and changing the pilot relief pressure setting. The spring 117 is seated against a seat member 119, which is retained within the bore 107 by means of a pin 121**.

During the normal mode of operation as illustrated in FIG. 4, the bore 107 is drained to the transmission case drain through the opening 111. However, when the fluid pressure in the chamber 101 exceeds the predetermined maximum pressure (as determined by the biasing spring 117), the pressure unseats the pilot ball 115 from the valve seat 109, overcoming the spring 117, and moving the pilot ball 115 to the position shown in FIG. 5, uncovering a major portion of the opening 113. The chamber 101 is thus relieved through the bore 105 and the opening 113 to the case drain, substantially reducing the pressure in the chamber 101. When this occurs, high pressure below the acceleration valve 85, acting in conjunction with the spring 87, biases the acceleration valve 85 upward to relieve a portion of the fluid below the acceleration valve 85 past the seat 103, then through the cross bore 93 to the low pressure side of the system, in generally the same manner described previously. It is anticipated that, in view of the relatively small relief passage past the acceleration valve 85, the acceleration valve 85 (now acting as a relief valve) will not merely remain in a single, discrete position as shown in FIG. 5, but instead, will probably oscillate somewhat about the position shown in response to pressure pulses as the pump rotor 29 rotates, i.e., until the system pressure again becomes stable.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A hydrostatic transmission comprising a pump for supplying pressurized fluid, a motor adapted to receive said pressurized fluid from said pump, and means defining a high pressure fluid conduit communicating said pressurized fluid from said pump to said motor, and a low pressure fluid source; housing means defining a valve bore in fluid communication with said high pressure fluid conduit and with said low pressure fluid source; an acceleration valve disposed within said valve bore and comprising a differential area piston having a first surface of relatively smaller area, and a second, opposing surface of relatively larger area, means biasing said differential are a piston toward an open position (FIG. 3) permitting fluid communication from said high pressure fluid conduit to said low pressure fluid source, high pressure fluid acting on said first surface cooperating with said biasing means to bias said differential area piston toward said open position; said piston defining restricted fluid passage means operable to communicate high pressure fluid to a chamber defined by said bore and said second surface; said differential area piston being biased by said high pressure fluid acting on said second surface gradually to overcome the biasing force of said biasing means and said high pressure fluid acting on said first surface, and to move toward a closed position (FIG. 4) blocking fluid communication from said high pressure fluid conduit to said low pressure fluid source, as the fluid pressure in said high pressure fluid conduit gradually increases; characterized by:

(a) said housing means defining a pilot bore disposed to provide fluid communication between said chamber and said low pressure fluid source;

(b) pilot valve means disposed in said pilot bore and including a valve member movable between a first position (FIG. 4) blocking fluid communication from said chamber to said low pressure fluid source, and a second position (FIG. 5) permitting fluid communication from said chamber to said low pressure fluid source; and (c) said pilot valve means including means biasing said valve member toward said first position with a sufficient force whereby, only when the fluid pressure in said high pressure fluid conduit exceeds a predetermined maximum, the fluid pressure in said chamber exceeds said predetermined maximum, overcoming the force of said pilot valve biasing means and moving said valve member to said second position, whereby the fluid pressure in said chamber substantially decreases and said differential area piston is biased toward said open position (FIG. 5), thereby relieving the fluid pressure in said high pressure fluid conduit.

2. A hydrostatic transmission as claimed in claim 1, characterized by both said pump and said motor being disposed in said housing means, said housing means defining a case drain region comprising said low pressure fluid source.

3. A hydrostatic transmission as claimed in claim 2, characterized by said housing means defining a low pressure fluid conduit communicating return fluid from said motor to said pump.

4. A hydrostatic transmission as claimed in claim 3, characterized by said housing means defining a pintle assembly including a pintle portion disposed axially between said pump and said motor, said valve bore being defined by said pintle portion.

5. A hydrostatic transmission as claimed in claim 4, characterized by said pintle assembly including journal portions extending axially on either side of said pintle portion, said journal portions defining said high pressure fluid conduit and said low pressure fluid conduit.

6. A hydrostatic transmission as claimed in claim 5, characterized by said pump including a pump rotor mounted for rotation about a forward portion of said journal portions, and said motor including a motor rotor mounted for rotation about a rearward portion of said journal portion.

7. A hydrostatic device operable as either a pump or a motor comprising housing means defining first and second fluid conduits, and a fluid displacement mechanism operable to define expanding and contracting fluid volume chambers in fluid communication with said first and second fluid conduits, respectively; said housing means defining first and second valve bores in fluid communication with said first and second fluid conduits, respectively; first and second acceleration valves disposed in said first and second valve bores, respectively, and said housing means defining fluid passage means providing communication between said first and second valve bores; each of said acceleration valves comprising a differential area piston having a relatively smaller area and an opposed, relatively larger area, and means biasing said pistons toward an open position (FIG. 3) permitting fluid communication from its respective fluid conduit to said fluid passage means; fluid pressure acting on said smaller area cooperating with said biasing means to bias said differential area piston toward said open position; each piston defining a restricted fluid passage operable to communicate relatively high pressure fluid to a chamber defined by its respective bore and said larger area, said piston being biased by said relatively high pressure fluid acting on said larger area gradually to overcome the biasing force tending to move said piston toward said open position, thereby moving said piston toward a closed position (FIG. 4) blocking fluid communication of its respective fluid conduit to said fluid passage means, as the fluid pressure in said respective fluid conduit gradually increases; characterized by:

(a) first and second pilot valve means operably associated with said first and second acceleration valve, respectively;

(b) each of said pilot valve means comprising a pilot bore defined by said housing means and disposed to provide fluid communication from said larger area of said acceleration valve to a low pressure fluid source;

(c) each of said pilot valve means including a valve member movable between a first position (FIG. 4) blocking fluid communication through said pilot bore, and a second position (FIG. 5) permitting fluid communication through said pilot bore; and (d) each of said pilot valve means further including means biasing said valve member toward said first position with a force corresponding to a predetermined, maximum fluid pressure in said chamber and whichever of said first and second fluid conduits contains high pressure.

8. A hydrostatic device as claimed in claim 7, characterized by said housing means defining a pintle assembly including a pintle portion disposed axially adjacent said hydrostatic device, said first and second valve bores being defined by said pintle portion.

9. A hydrostatic device as claimed in claim 8, characterized by said pintle assembly including a journal portion extending axially from said pintle portion, said journal portion defining said high pressure fluid conduit and said low pressure fluid conduit.

10. A hydrostatic device as claimed in claim 9, characterized by said hydrostatic device including a rotor, mounted for rotation about said journal portion.

* * * * *